G. W. WEBER.
FRICTION TOP PAINT CAN.
APPLICATION FILED APR. 26, 1909.
1,176,007.
Patented Mar. 21, 1916.
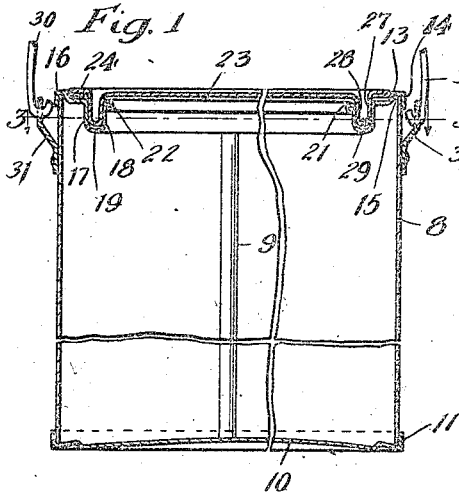
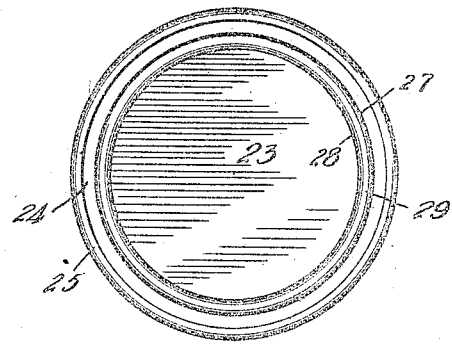
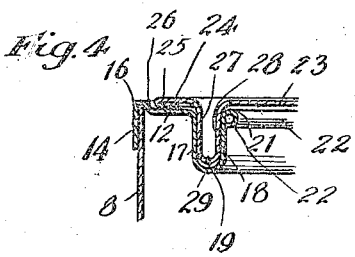
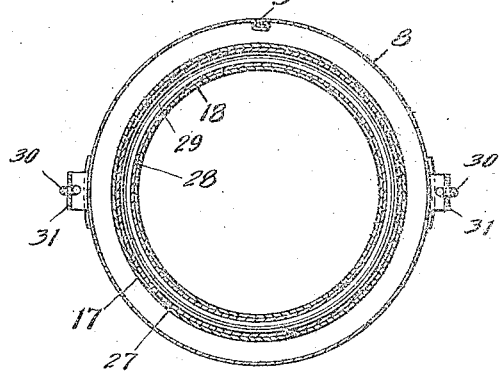
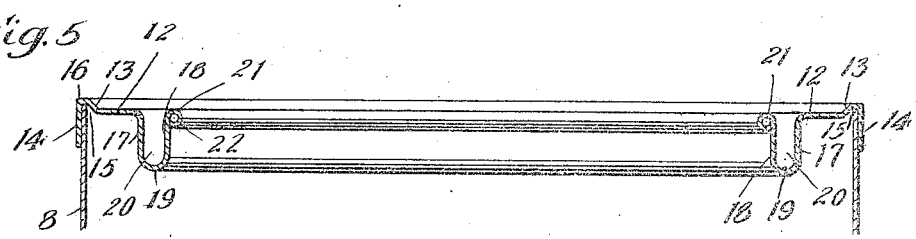
Witnesses:
Wm Giger
H. W. Munday
Inventor:
George W. Weber
By Munday, Evarts, Adcock & Clarke
Attorneys

UNITED STATES PATENT OFFICE.

GEORGE W. WEBER, OF NEW YORK, N. Y., ASSIGNOR TO AMERICAN CAN COMPANY, OF NEW YORK, N. Y., A CORPORATION OF NEW JERSEY.

FRICTION-TOP PAINT-CAN.

1,176,007.

Specification of Letters Patent.   Patented Mar. 21, 1916.

Application filed April 26, 1909.   Serial No. 492,268.

*To all whom it may concern:*

Be it known that I, GEORGE W. WEBER, a citizen of the United States, residing in New York, in the county of New York and State of New York, have invented a new and useful Improvement in Friction-Top Paint-Cans, of which the following is a specification.

My invention relates to improvements in friction top cans.

The object of my invention is to provide a friction top paint can which will be of a simple, efficient and durable construction, capable of being repeatedly opened and closed, and which will also be suitable for use as a paint pot or pail, and which may be made of the larger or half gallon or gallon sizes without liability of the friction cover springing off or failing to produce a secure and liquid tight closure by its tight frictional engagement alone with the annular top head of the can.

My invention consists in the novel construction of parts and devices, and in the novel combinations of parts and devices by which this object or result is practically accomplished, as herein shown and described and more particularly specified in the claims.

In the accompanying drawing forming a part of this specification, Figure 1 is a central, vertical section of a friction top paint can embodying my invention. Fig. 2 is a detail bottom plan view of the cover. Fig. 3 is a horizontal section on line 3—3 of Fig. 1. To save space on the drawing, Figs. 2 and 3 represent a can of small diameter. Fig. 4 is an enlarged detail partial vertical section and Fig. 5 is a detail, partial vertical section with the cover removed.

In the drawing, 8 is the body of the can having the customary lock or other soldered side seam 9.

10 is the bottom head having an upturned marginal flange 11 soldered to the lower end of the body 8.

12 is the annular top head, having an inclined upwardly projecting annular flange 13 and marginal rim or flange 14 forming an annular channel 15 to receive the upper end of the body 8 which is soldered to said rim or flange 14, said flange 13 forming an annular raised fulcrum shoulder 16 to facilitate the levering up or prying off of the friction cover. The annular top head 12 is also provided with two substantially parallel but slightly flaring depending friction seat walls 17, 18 connected together by a curved bottom wall 19 and together forming an annular U-shaped channel 20 to receive the double annular friction seat walls of the cover.

The annular top head 12 is further provided at the upper edge of its inner friction seat wall 18 with an inwardly projecting annular lip or flange 21 having a reversely folded or curled edge 22 to stiffen and strengthen the inner friction seat wall 18, and at the same time afford a smooth wiping edge or lip for the paint brush when the can is being used as a paint pot or pail. The folded or curled annular flanges 21, 22, surrounding the opening in the annular top head, while bracing and stiffening the inner annular friction seat wall 18, at the same time leave said friction seat wall sufficiently yielding and elastic to produce an extremely close, tight and secure engagement between the inner and outer friction seat walls of the cover and the corresponding inner and outer friction seat walls of the annular top head, and to permit of the cover being forced snugly and fully home, and thus free from liability of springing off.

The friction cover 23 has a marginal, flat, horizontally projecting annular pry-off rim 24, provided with an annular inturned fold or flange 25 to reinforce it, said pry-off rim fitting within the raised annular fulcrum shoulder 16 of the annular top 12, said annular pry-off rim and fulcrum shoulder forming between them an annular crevice or channel 26 to receive a lever or sharp edged instrument for prying off or levering up the tight fitting friction cover. The friction cover 23 is provided with two depending substantially parallel but slightly wedging friction seat walls 27, 28, the outer one 27 being in tight frictional engagement with the outer friction seat wall 17 of the annular top and the inner one 28 in tight frictional engagement with the inner friction seat wall 18 of the annular top. The two deep depending friction seat walls 27 and 28 of the cover are integrally united or connected together by a curved bottom wall 29. The annular top 12 and cover 23 are made of thin sheet metal, preferably tin plate, and the interengaging double friction seat walls 17, 18 of the annular top and 27, 28 of the cover are all slightly yielding, springy or elastic, while at the same time sufficiently braced and stiffened to produce an extremely snug, tight and secure frictional engagement between the cover and annular top so as to produce a liquid tight closure between the cover and annular top in the larger or gallon size paint cans, as well as in the smaller sizes, and thus prevent all liability of the cover loosening or springing off, or the closure becoming leaky or defective. The annular pry-off rim of the cover fits within and substantially flush with the raised annular fulcrum shoulder 16 of the top head, thus enabling the cans to be stacked or piled in shipment, one on top of another, without affecting or tending to loosen the tight frictional engagement of the cover with the annular top. The can body 8 is or may be furnished with a bail 30 and bail ears 31 to facilitate the use of the can as a paint pot or pail.

I claim:—

1. A friction top paint can comprising in combination: a can body; a can top attached thereto and bent to form an annular cover-engaging and friction clamping means, said top being bent downwardly to form an outer vertical friction seat wall, thence upwardly to form an inner vertical parallel friction seat wall, and thence curved inwardly and downwardly to form an annular brush-wiping and wall-stiffening lip; and a can cover having a flange bent downwardly to form an outer vertical friction seat wall adapted to frictionally engage with said outer vertical friction seat wall of the can top, and thence upwardly to form a parallel inner vertical friction seat wall adapted to frictionally engage with said inner parallel vertical frictional seat wall of the can top, clearance being provided between the top and cover both at the inner and outer sides of the said friction walls and at the bottoms of said friction walls; substantially as specified.

2. A friction top paint can comprising in combination: a can body; a can top attached thereto and bent to form an annular cover-engaging and friction clamping means, said top being bent downwardly to form an outer vertical friction seat wall, thence upwardly to form an inner vertical parallel friction seat wall, and thence curved inwardly and downwardly to form an annular brush-wiping and wall-stiffening bead or roll; and a can cover having a flange bent downwardly to form an outer vertical friction seat wall adapted to frictionally engage with said outer vertical friction seat wall of the can top, and thence upwardly to form a parallel inner vertical friction seat wall adapted to frictionally engage with said inner parallel vertical friction seat wall of the can top, and thence inwardly to form the horizontal portion of the can cover; clearance being provided between the top and cover both at the inner and outer sides of the said friction walls and at the bottoms of said friction walls, and the lower ends of the vertical and parallel friction seat walls of the cover being rounded to form a wedging ring at the extreme bottom of the depending annular part of the cover; substantially as specified.

GEORGE W. WEBER.

Witnesses:
L. A. WELLES,
WALTER HENRY.